United States Patent [19]

Dunathan

[11] 3,707,948
[45] Jan. 2, 1973

[54] OYSTER SPAWNING FACILITY
[75] Inventor: Jay P. Dunathan, Tequesta, Fla.
[73] Assignee: Oceanography Mariculture Industries, Inc., Riviera Beach, Fla.
[22] Filed: Dec. 1, 1970
[21] Appl. No.: 93,963

[52] U.S. Cl. ....................................................119/4
[51] Int. Cl. ..............................................A01k 61/00
[58] Field of Search ....................................119/4, 3, 2

[56] References Cited

UNITED STATES PATENTS 3,196,833   7/1965   Glancy ....................................119/4
3,192,899   7/1965   Lucey et al. ...........................119/4
3,028,837   4/1962   Tuttle ...................................119/2 X Primary Examiner—Hugh R. Chamblee
Attorney—Oblon, Fisher & Spivak

[57] ABSTRACT

A single closed system facility is provided for both preconditioning and inducing oysters to spawn. The facility comprises an insulated cabinet having vertically arranged, slidably disposed trays or drawers which are supplied with water from a plurality of pipes, each conducting water of a different temperature, so that the temperature of the water in each tray may be selectively controlled by valving the proportion of the water being received therein from the respective pipes. Drain pipes from the trays feed into a vertical pipe disposed outside the cabinet which feeds into a filtering and collecting basin, from which the filtered water is pumped and returned to its source. Operatively, the upper trays may be used for conditioning oysters placed therein by providing water thereto and feeding the same with artificially grown food according to a prescribed program for a predetermined period of time. After this time, the oysters may be placed in the lower trays, wherein the water is maintained at a predetermined temperature most desirable for inducing the oysters to spawn. After spawning and fertilization of the eggs, removal from the spawning trays may be accomplished by siphoning the same into a nearby aquarium tank.

12 Claims, 3 Drawing Figures

PATENTED JAN 2 1973

INVENTOR
JAY P. DUNATHAN

BY *Oloy, Fisher & Spivak*
ATTORNEYS

PATENTED JAN 2 1973 3,707,948

OYSTER SPAWNING FACILITY

BACKGROUND OF THE INVENTION

This invention relates to the spawning of oysters generally, and more particularly concerns a single closed system facility which is environmentally controlled for pre-conditioning oysters and for inducing them to spawn.

For many years, much time and energy have been expended in seeking practical methods of artificially producing oysters. Since it is now well recognized that oysters can be stimulated to spawn by varying the water temperature, most of the methods which have been developed for artificially producing oysters usually involve placing selected male and female oysters in tanks of water, where spawning may be induced through prescribed pre-conditioning techniques involving a cyclic variation of the water temperature. Heretofore, however, this pre-conditioning aspect of the artificial production of oysters has been carried out in a separate facility from that in which the spawning was actually induced. This has been the case because the two aspects are best carried out under different water temperature and flow characteristics. Thus, because of a lack of adequate controls, the two aspects of pre-conditioning and spawning have required a duplication of efforts in handling the separate facilities therefor in the previous methods of artificially producing oysters. Furthermore, another disadvantage of the necessity for providing separate facilities is that of the requirement for additional space to accommodate these facilities.

Among the critical factors determining the number of oysters which are produced at their natural spawning grounds, and accordingly which must be controlled in any attempt to artificially produce the same, are the water temperature, water salinity, and the presence or absence of marine organisms which may destroy the seed. The latter, of course, is not a problem in an artificial oyster spawning assembly, and although the water temperature and water salinity are readily controllable in systems heretofore available, no adequate controls have yet been provided, as indicated hereinbefore, which would permit the pre-conditioning and spawning processes to be carried out in a single facility.

Fish spawn hatching assemblies are presently available in which a plurality of pairs of tray members, one being received in nested relationship within the other, are arranged in a vertical array, and means are provided for admitting water to the surface area of the bottom wall of the upper tray of each pair so that it may flow over the top thereof, then downwardly into the lower tray of the pair, then sequentially following the same pattern into the pair of nested tray members disposed immediately therebelow, whereby substantial equalization of the water temperature between the inlet and outlet of each tray assembly is achieved by means of a thermal exchange through the bottom wall of the upper tray. In other words, if the outlet water has a tendency to be somewhat warmer than the inlet water, then the inlet water will be warmed by the outlet water through the bottom wall of the upper tray of each pair of tray members. Such an assembly is disclosed by H. H. Tuttle, in U.S. Pat. No. 3,028,837, which issued Apr. 10, 1962. Yet even this device fails to provide any precise control of the temperature of the water flowing through the individual pairs of nested tray members, and thus it would not be suitable for carrying out the pre-conditioning and spawning of oysters in the artificial production thereof.

SUMMARY OF THE INVENTION

Accordingly, it is an object of the present invention to provide an improved oyster spawning assembly in which the efficiency and production output are significantly increased.

Another object of the present invention is to provide a single facility for conditioning and spawning oysters in a controlled temperature environment.

Still another object of the present invention is to provide a labor and space saving, single closed system in which the same controls may be used for controlling the temperature conditions for different functions of artificial oyster production, namely, the pre-conditioning and spawning thereof.

Still a further object of this invention is to provide an improved apparatus and method for artificially producing oysters.

These and other objects are achieved by the present invention which provides an insulated cabinet having trays or drawers vertically arranged and slidably disposed therein, which are supplied with water from a plurality of pipes, each conducting water of a different temperature, whereby the temperature of the water in each individual tray may be selectively controlled simply by valving the water from each pipe so as to proportion the flow from each. Drain pipes from each of the trays feed into a vertical pipe disposed outside the insulated cabinet which leads to a filtration and collecting basin, from which the filter water may be pumped and returned to its source. Thus, the upper trays may be used for conditioning oysters placed therein by providing water thereto at a predetermined temperature, determined by the amount of water being received from each of the respective pipes, and feeding the oysters according to a prescribed program for a predetermined period of time. After this time, the oysters may be placed in the lower trays, wherein the water may be maintained in the same manner at a predetermined temperature which is most desirable for the purpose of stimulating spawning. Thereafter, and upon fertilization of the eggs, removal from the spawning trays may be accomplished by siphoning the same into a nearby aquarium tank.

BRIEF DESCRIPTION OF THE DRAWINGS

Various other objects, attendant features and advantages of the present invention will be more readily appreciated as the same becomes better understood from the following detailed description thereof when considered in connection with the accompanying drawings, in which like reference numerals are used to designate like or corresponding parts throughout the several Figures, and wherein.

DESCRIPTION OF A PREFERRED EMBODIMENT

Figure 1:
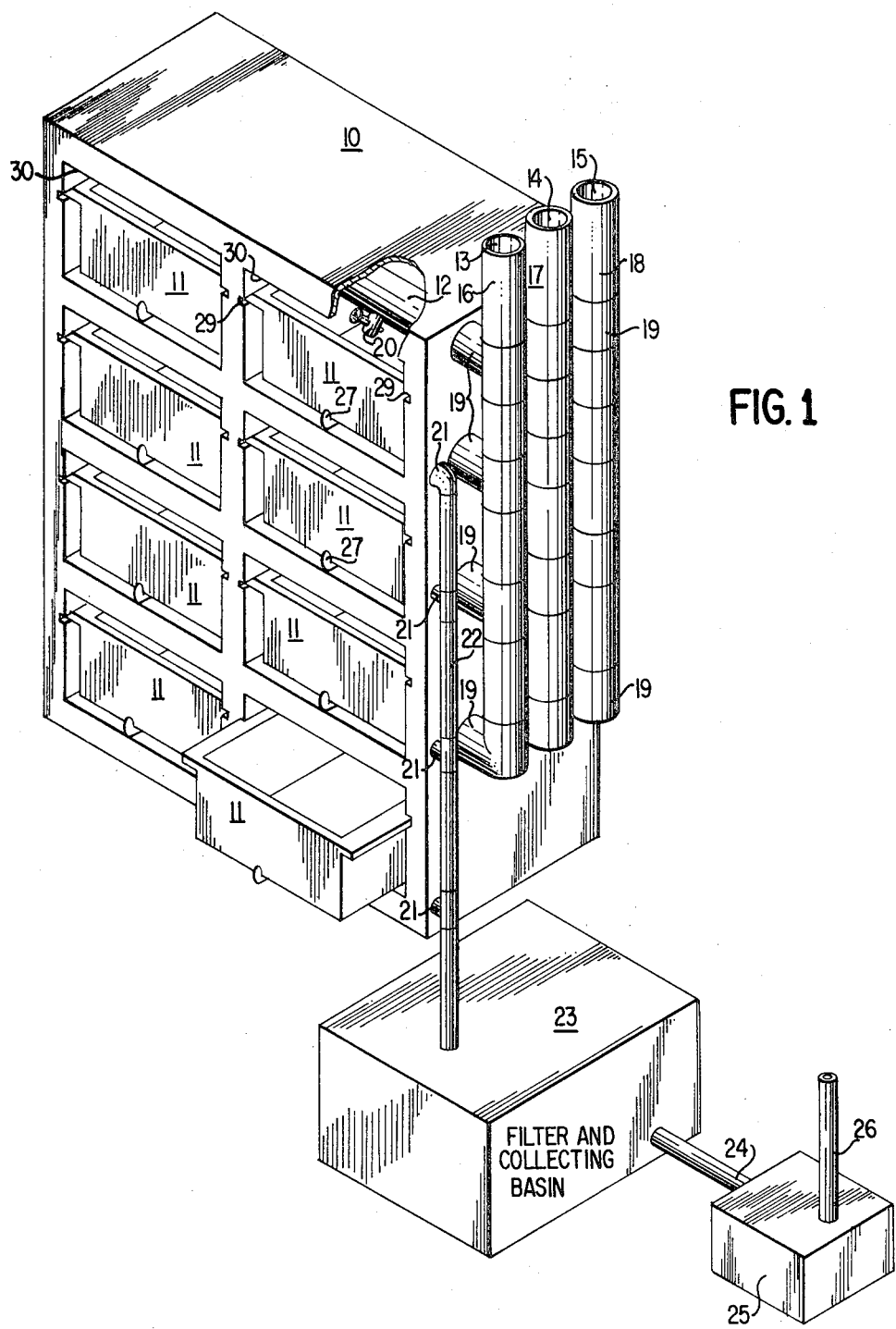
FIG. 1 is a perspective view of an oyster spawning facility constructed according to the teachings of this invention and illustrating an insulated cabinet for a plurality of conditioning or spawning drawers, a water-conducting pipe network, and a filtration and collection basin.

Referring now to the drawings, and more particularly to FIG. 1, there is shown an insulated cabinet 10 having a plurality of vertically arranged drawers, or trays, 11, slidably disposed therein, being shown as eight in number, with a side-by-side pair positioned at each of four levels.

Water flows into each of the drawers 11 from a plurality of pipes 12, preferably three in number, which are horizontally disposed and positioned immediately above the drawers, and which are connected to respective supply sources 13, 14 and 15 of water through a set of pipes 16, 17 and 18 vertically oriented in parallel relation just outside the insulated cabinet 10. Each pair of drawers 11 positioned at each respective level is supplied with water from a different set of pipes 12, which in turn are connected through the wall of the insulated cabinet 10 to the vertical pipes 16, 17 and 18 by tees 19.

On each of the three horizontal pipes 12, a valve 20 is provided for regulating the amount of water flowing from each of the three pipes into each drawer, for a purpose which will be further explained hereinbelow.

Horizontally disposed drain pipes 21 are positioned below each of the pairs of drawers 11 at each respective level and are connected to another vertical pipe 22 outside the cabinet 10 for carrying water from the drawers 11 to a filter and collecting basin 23. The filter portion of the filter and collecting basin 23 may be a bed of particulate, activated charcoal through which the water being drained from the drawers 11 is permitted to gravitate, or it may be any other known type which is suitable for the purpose. From the collecting basin portion of the filter and collecting basin 23 positioned immediately below the filter portion thereof, the filtered water is fed through a conduit 24 to a pump 25, which returns the water to the water supply sources 13, 14 and 15 by means of a pipe 26 connected to the output of the pump.

Figures 2, 3:
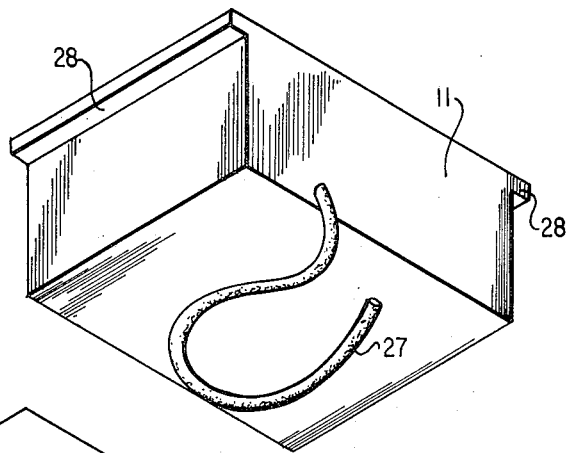
FIG. 2 is a perspective view of the bottom, or underside, of one of the drawers shown in FIG. 1; and, FIG. 3 is a perspective view of the apparatus illustrated in FIG. 1, showing the water supply tanks therefor and doors for closing the conditioning and spawning drawers within the cabinet.

Referring now to FIG. 2, in which one of the drawers 11 is shown being removed from the insulated cabinet 10, it may be seen that each drawer is provided with a flexible hose 27 which is connected at one end to the forward, or front, wall portion of the drawer and is connectable at its other end to the respective horizontal drain pipe 21 positioned immediately therebelow when the drawer 11 is properly inserted into the cabinet 10. Also, each drawer 11 is provided with projecting ribs 28 at the top edge of each of the opposing side walls thereof for the purpose of supporting the drawer within elongate rib-receiving slots 29 in each of the openings 30 provided in the cabinet front for receiving the drawers, or trays, 11. Thus, the purpose of the hose 27 is two-fold in that it primarily furnishes a conduit for draining the drawer 11 to the drain pipe 21, and also, that it allows the drawer 11 to slide freely within its respective opening 30 in the cabinet 10, the hose normally resting in the opening 30 underneath the drawer 11.

In FIG. 3, the cabinet 10 is provided with insulated doors 31 which are hingedly affixed to the cabinet along either the upper or lower edge thereof, and are provided with handles 32 for opening and closing the same, to thereby cover the openings 30 in the cabinet 10 when the drawers 11 are placed therein to further maintain the desired environmental conditions therewithin. It may be observed that the two upper drawers 31 are shown being hinged from the upper edge, while the two lower drawers 31 are hingedly affixed to the cabinet along their lower edges. The direction of door openings is selected for reasons of convenience, and in this case, since the lower drawers 11 are designed for use as spawning trays, the doors 31 therefor preferably open from the top to permit more ready visual observation, as is necessary in this stage, of the contents of the trays 11 without sliding the same outward from the cabinet openings.

In summary, water of different temperatures flows from the sources 13, 14 and 15 through the respective vertical pipes 16, 17 and 18 and into the three horizontal pipes 12 positioned over each of the drawers, or trays, 11. Each of the valves 20 is preset to allow a predetermined amount of water from each of the three pipes 12 to flow into each tray 11. This water flow preferably is regulated to be less than 5 gallons per hour.

The water collected in the bottom of each tray 11 is returned by the flexible tubing 27 to the horizontal drain pipe 21 therebelow, which carries it outside the cabinet 10 to the vertical pipe 22 and then to the sump-filter 23. From the sump 23, the filtered water is fed to pump 25 for return to its source.

The three water sources 13, 14 and 15 are filled with water of approximately 25 parts per thousand salinity and are heated or cooled, depending upon the tank, for the purpose of furnishing three different controlled water temperatures to the trays 11, as desired and preset. In one compartment, for example, the water may be heated with an immersion water heater to 35° C., while in another, the water may be cooled to 10° C. with an immersion cooler. Then, if the water in the third tank is at ambient temperature, each tray 11 containing oysters has availability to water at temperatures of 35° C., 10° C., and ambient. The seawater at these three temperatures can then be mixed, according to the setting of the valves 20 in each of the horizontal pipes 12 over each tray, for obtaining the proper temperature water for conditioning the oysters and for stimulating spawning.

In a preferred method of operation, the top two rows of trays 11 are used for conditioning the oysters. Thus, a predetermined number of oysters is placed in each tray 11 and the water temperature is adjusted to a temperature of between 15° C. and 20° C. The oysters in each tray are fed a suitable nutrient, such as cornmeal, daily, and are allowed to stay in the 15° C. to 20° C. water for approximately 2 weeks.

After this period of pre-conditioning, the oysters may be placed in the bottom two rows of trays, which are preferably used for spawning. The water in these trays, accordingly, is maintained between 30° C. and 35° C. About 8 hours after being transferred from the conditioning trays to the spawning trays, flow of water through the trays is stopped and the oysters then must be observed hourly for any signs of spawning activity.

After spawning and fertilization of the eggs, the fertilized gametes of the oyster can then be removed from the spawning trays by siphoning the same into a glass aquarium tank.

Obviously, many modifications and variations of the present invention are possible in light of the above teachings. For example, drain tanks could be provided immediately below each of the trays 11 in place of the horizontal pipes 21, the same also being in fluid communication with the outside vertical pipe 22 in any suitable manner. In this case, the flexible hose 27 might still be used to provide a flow path between each of the trays 11 and its respective drain tank, or the trays 11 might instead drain directly into the drain tank therebelow. Also, in practicing the invention, instead of transferring the oysters from the upper, or conditioning, trays to the lower, or spawning, trays, the entire tray might be transferred from an upper level to a lower level and the water temperature therein varied as in the other method. Thus, it is to be understood that within the scope of the appended claims, the invention may be practiced otherwise than as specifically described herein.

What is claimed as new and desired to be secured by Letters Patent of the United States is:

1. An oyster spawning facility comprising:
   an insulated cabinet having a plurality of trays slidably disposed in openings therein;
   a plurality of water supply tanks;
   means for maintaining the water in each of said water supply tanks at a different temperature;
   means for conducting water from each of said tanks to each of said trays;
   means for regulating the flow of water from each of said tanks into each of said trays to selectively control the temperature of water in each tray; and,
   means for continuously circulating water between said trays and said water supply tanks.

2. The invention according to claim 1, wherein said plurality of trays are vertically arranged to be disposed at different levels in said cabinet.

3. The invention according to claim 2, wherein said water conducting means comprises:
   vertically oriented conduits equal in number to said water tanks being disposed adjacent said insulated cabinet;
   horizontally oriented conduits, one each leading from each of said vertically oriented conduits to each of said different levels of said trays; and,
   means connecting said vertically oriented conduits respectively with said water supply tanks, for supplying water of each of said temperatures to each of said trays.

4. The invention according to claim 3, wherein said flow regulating means comprises a valve in each of said horizontally oriented conduits for each of said trays for controlling the amount of water at each temperature being delivered to each of said trays.

5. The invention according to claim 2, wherein said water circulating means comprises:
   a sump;
   means for draining water from each of said trays into said sump;
   conduit means connecting said sump and said water supply tanks; and,
   a pump for moving water from said sump through said conduit means to said water supply tanks.

6. The invention according to claim 5, further including filter means in said sump.

7. The invention according to claim 5, wherein said draining means comprises:
   a vertically oriented drain conduit disposed adjacent to said cabinet;
   horizontally oriented drain conduits, one each leading from each of said different levels of said trays to said vertically oriented drain conduit; and,
   means for draining water from each of said trays to the horizontally oriented drain conduit disposed at the respective level thereof.

8. The invention according to claim 7, wherein said means for draining water from each of said trays comprises a flexible hose adapted to connect each respective tray with its respective horizontally oriented drain conduit.

9. The invention according to claim 2, further comprising insulated doors for covering each of said openings in said insulated cabinet.

10. The invention according to claim 9, wherein at least the lowermost of said doors are arranged to open downwardly for permitting ready observation of said trays in said openings covered thereby without removing said trays.

11. The invention according to claim 2, wherein said trays are vertically arranged in pairs, each pair being disposed at a different level in said cabinet.

12. An oyster spawning facility comprising:
   an insulated cabinet having a plurality of trays slidably disposed in openings therein, said trays being vertically arranged in pairs disposed at different levels in said cabinet;
   a plurality of water supply tanks;
   means for maintaining the water in at least one of said water supply tanks at a temperature of approximately 10° C.;
   means for maintaining the water in at least one other of said water supply tanks at a temperature of approximately 35° C.;
   means for maintaining the water in at least one other of said water supply tanks at ambient temperature;
   means for conducting water from each of said water supply tanks to each of said trays;
   means for regulating the flow of water from each of said water supply tanks into each of said trays to selectively control the temperature of water in each of said trays;
   a sump;
   means for draining water from each of said trays into said sump;
   filter means in said sump; and,
   means for pumping filtered water from said sump to said water supply tanks.

* * * * *